INVENTOR
NAGAMASA SASSA
BY Moonray Kojima
ATTORNEY

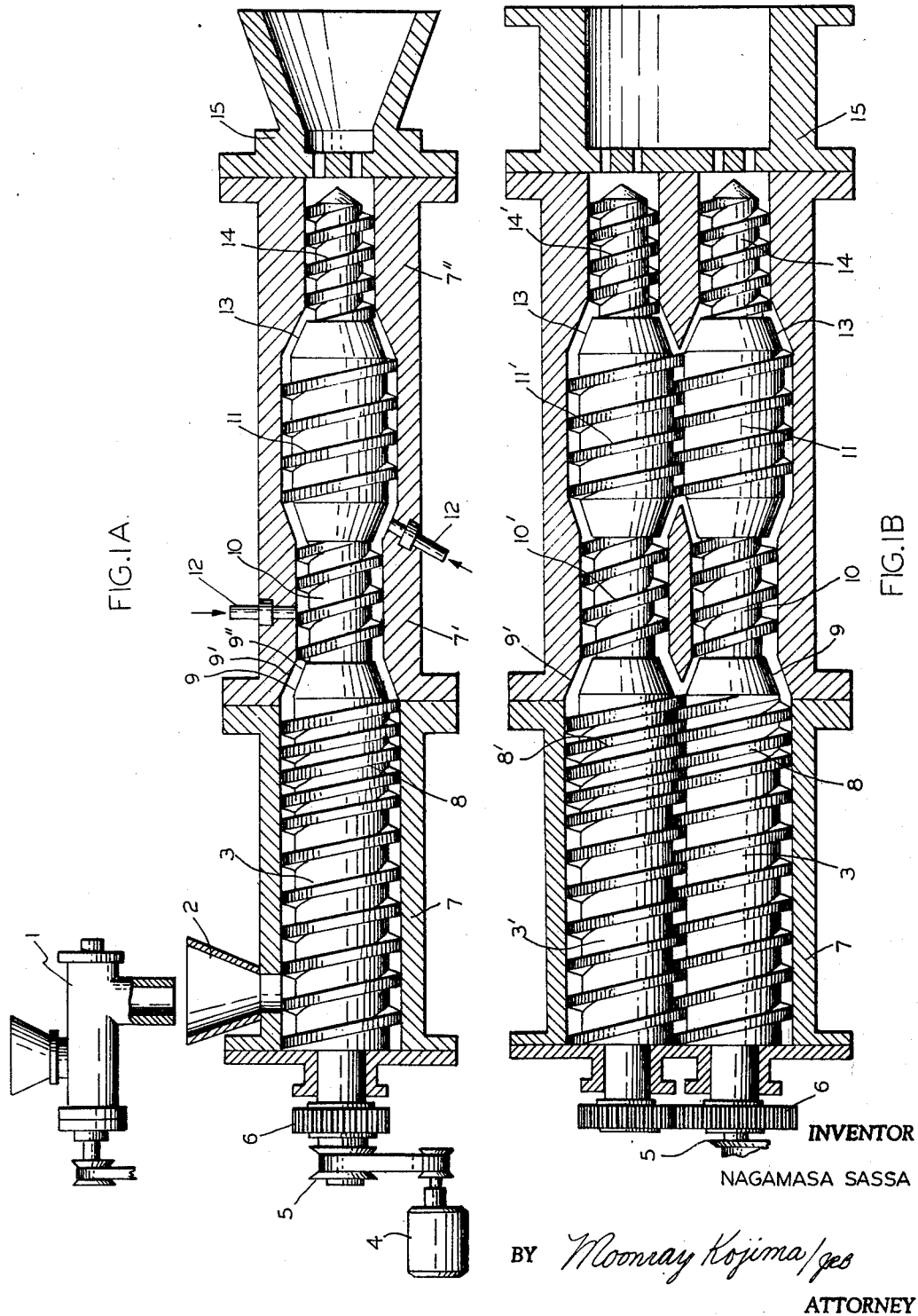

United States Patent Office 3,499,186
Patented Mar. 10, 1970

3,499,186
EXTRUDER FOR PRODUCING POROUS SHAPED RESINOUS ARTICLES
Nagamasa Sassa, Osaka, Japan, assignor to Kanegafuchi Kagaku Kogyo Kabushiki Kaisha, Osaka, Japan, a corporation of Japan
Filed Mar. 25, 1968, Ser. No. 715,864
Claims priority, application Japan, Apr. 5, 1967, 21,744/67
Int. Cl. B29f 3/02
U.S. Cl. 18—12          2 Claims

ABSTRACT OF THE DISCLOSURE

Extruder for producing porous shaped resinous articles, said extruder being of any of the type comprising double screws, engaging discs, or intensive mixer rolls for carrying out kneading method and having first orifice means at the tip of the melting or gelation station of the raw plastic resin in the extruder, a kneading station for kneading foaming agent and said plastic resin together being connected to said first orifice means, said kneading station having inlet means for introducing foaming agent, said foaming agent and said plastic resin being kneaded together by means of said double screws, engaging discs, or double intensive mixer rolls, said extruder having furthermore second orifice means and a screw extruding station in the above mentioned order, a molding die being mounted on the tip of said extruding station.

---

Figures 2A, 2B:
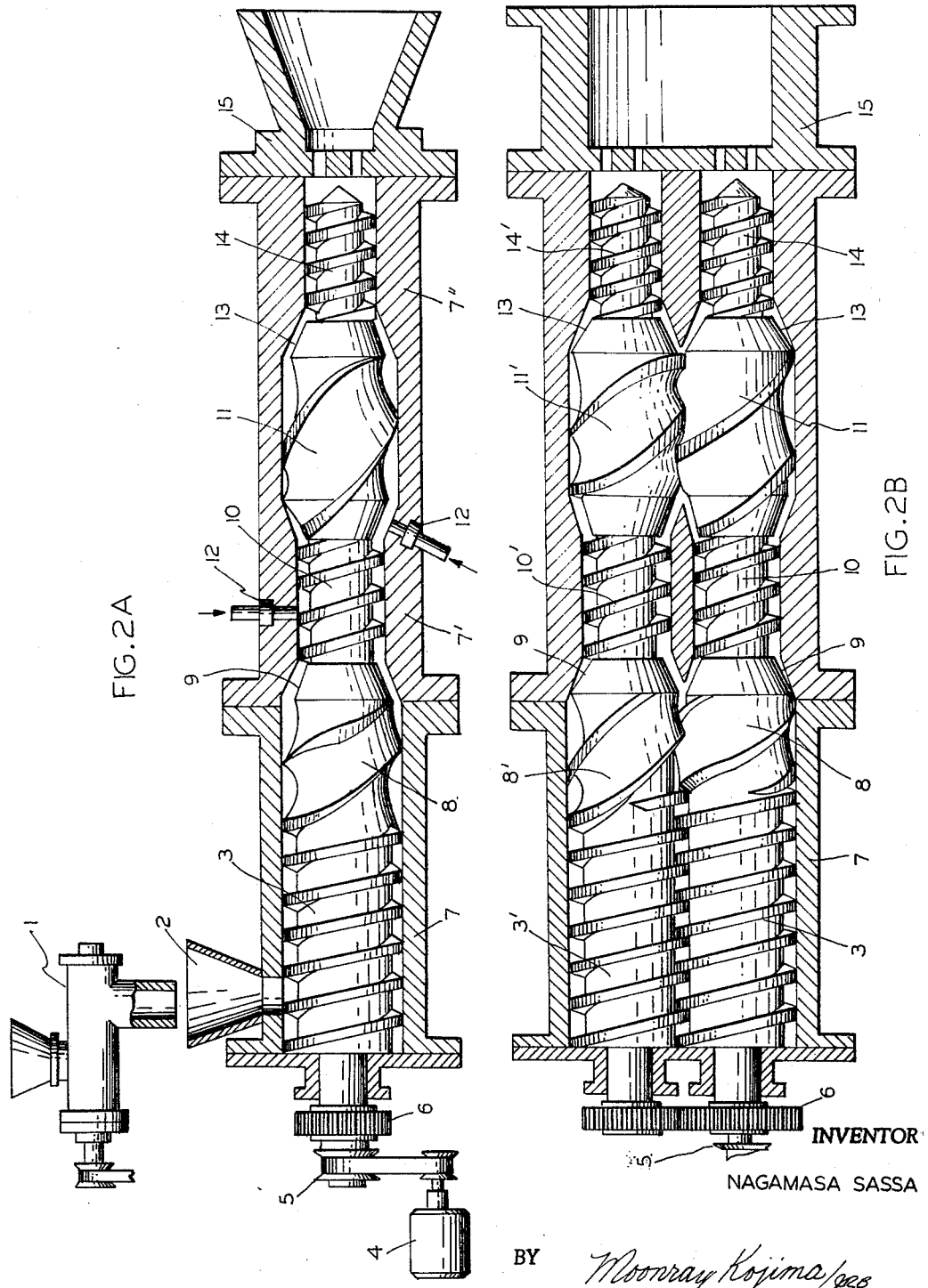

The present invention relates to an extruder for producing porous shaped resinous articles.

Heretofore, an extruder of the single screw type has been utilized for extruding and holding the mixture of gelatinized resin and foaming agent. In such a case, since the kneading of the gelatinized resin and the foaming agent is insufficient, foaming of the mixture is necessarily uneven when it is extruded to the atmosphere from the die of the extruder thereby deteriorating the quality of the shaped articles.

The present invention provides an improved extruder for producing porous shaped resinous articles which has not the above mentioned disadvantages of the prior art.

The present invention provides an improved extruder for producing porous shaped resinous articles and comprising double screws, engaging discs, or intensive mixer rolls, a melting or gelation station for melting raw plastic resin supplied thereto, and a kneading station for kneading the plastic resin and foaming agent, said kneading station having inlet means for introducing said foaming agent, first orifice means being provided at the tip of said melting station, said first orifice means being connected to the front side of said kneading station for kneading said foaming agent and said plastic resin said foaming agent and said plastic material being kneaded together by means of said double screws, engaging discs, or double intensive mixer rolls, said extruder having furthermore second orifice means located in such a manner that said kneading station is connected between said first orifice means and said second orifice means so that gelatinized resin is completely gas-tightly constrained in said kneading station by virtue of the provision of said first and second orifices connected to the front and the rear sides of said kneading, said second orifice means being provided with an extruding station which mounts a die on the tip thereof.

FIG. 1A is a cross-sectional view taken along a vertical plane passing through the double screw type extruder constructed in accordance with the present invention.

FIG. 1B is a cross-sectional view taken along a horizontal plane passing through the extruder shown in FIG. 1A, FIG. 2A is a cross-sectional view taken along a vertical plane passing through the double intensive mixing roll type extruder constructed in accordance with the present invention, and FIG. 2B is a cross-sectional view taken along a horizontal plane passing through the extruder shown in FIG. 2A.

In FIGS. 1A and 1B, the raw plastic resin is supplied to hopper 2 constituting the supply station together with double screws 3, 3'. Double screws 3, 3' are located in parallel to each other and engages with each other. Double screws 3, 3' are driven by motor 4 through pulley 5, gear train 6. Double screws 3, 3' are housed in barrel 7 in conventional manner. Gelation station, i.e. melting station 8, 8' are provided at the rear side of said supply station comprising double screws 3, 3', The raw plastic resin is kneaded and gelled in the space formed between the inside surface of said barrel 7 and the peripheral surface of each of said screws 3, 3', said peripheral surface of each of screws 3, 3' being provided with helical threads engaging with each other. Heating and cooling device not shown is provided on said barrel 7 for supplying heat to the raw plastic resin for the gelation thereof or cooling the raw plastic resin so as to remove the excessive heat therefrom.

First orifice means 9 is located at the tip of melting, i.e. gelation station 8, 8'. This first orifice means 9 serves to flow gelled plastic resin therethrough and, at the same time, to keep said gelation station gas-tight by virtue of the flow of gelled plasic resin through said first orifice means 9. Said first orifice means 9 is constituted by conical portions 9' of barrel 7 and conical portions 9" of each of screws 3, 3'. Screws 10, 10' are located in barrel 7', said screws 10, 10' being spaced apart from each other in parallel relationship to each other so as to be rotated without contacting with each other. The diameter of each of screws 10, 10' may be smaller than that of melting, i.e. gelation station 8, 8', while the diameter of each of screws 11, 11' may be made equal to that of melting or gelation station. Kneading station comprising screws 11, 11' is connected to barrel 7' which is in turn connected to the end of gelation station 8, 8'. Inlets 12 for introducing foaming agent are provided in barrel 7'.

Foaming agent introduced in kneading station through inlets 12 is mixed with the plastic resin while the foaming agent is in the form of gas or liquid, and is sufficiently kneaded together by means of screws 11, 11' and the inner surface of barrel 7" surrounding said screws 11, 11' so as to form uniformly kneaded mixture of the gelled plastic resin and the foaming agent. Second orifice means 13 is provided at the ends of screws 11, 11', said second orifice means 13 being formed by the conical portions of said barrel 7" and the conical portions of said screws 11, 11'. Said first and second orifice means 9 and 13 serve to keep the gelled plastic resin in kneading station 11, 11' gas-tight by virtue of the flow of the plastic resin through said first and second orifice means 9 and 13, thereby preventing the foaming agent added to the gelled plastic resin from leaking out of the kneading station, and, at the same time, permitting the gelled plastic resin to be uniformly mixed with the foaming agent.

Screws 14, 14' are provided at the end of said second orifice means 13, said screws 14, 14' being spaced from each other. Die 15 is mounted on barrel 7" at the ends of said screws 14, 14'. The gel of the plastic resin with the foaming agent uniformly mixed therein is fed to die 15 in pressurized state without being foamed and is extruded from said die 15, so that porous shaped article of high quality is produced by allowing the extruded resin to foam and thereafter solidifying and cooling thereof.

If the plastic resin is taken out from the die without permitting the same to be foamed, foamable plastic resin material is obtained.

FIGS. 2A and 2B show an alternative embodiment of the present invention. The extruder shown in FIGS. 2A and 2B is substantially similar to that shown in FIGS. 1A and 1B except that the screws in the gelation or melting station shown in FIGS. 1A and 1B are substituted by double intensive mixer rolls 8, 8′ and, at the same time, the screws in the kneading station are replaced by double intensive mixer rolls 11, 11′.

In the previous description, the first orifice means and the second orifice means have been shown as having the conical configuration. However, the orifice means can be in the form of cylindrical shape, or in the form of one or more of the holes.

The above description refers to the embodiments in which one plastic gelation station, one kneading station for kneading plastic resin and foaming agent together are provided, respectively. However, two or more such stations can be provided in one extruder in the present invention.

As to the foaming agent to be used in the present invention, any materials can be used which are in the form of liquid or gas at room temperature and which are made gaseous form at a temperature equal to or higher than the gelation temperature of the plastic resin used.

Further, various additives such as nucleator, flame retarder and lubricant can be added to the plastic resin used.

Since the extruder in accordance with the present invention has double screws, engaging discs and double intensive mixer rolls, kneading of the plastic resin are superior in comparison with the single screw type extruder of the prior art.

And further, since the orifice means permit the space in which the foaming agent is introduced to be kept sufficiently gas-tight thereby preventing the foaming agent from flowing out of the space, porous shaped articles having uniform distribution of gas cells can be produced.

What is claimed is:
1. Extruder for producing porous resin comprising:
 (a) holder means;
 (b) a pair of parallely disposed shafts rotatably positioned within said holder means, said shafts each having therein serially connected first, second, third and fourth screw means, said first and third screw means of each shaft being respectively intermeshed with each other, said second and fourth screw means of each shaft being separate from each other;
 (c) said holder means defining a pair of first and second conically shaped orifices spaced apart from each other and through which said shafts are disposed, said second and third screw means of each shaft being located between said first and second orifices;
 (d) said shafts each having a first conically shaped smooth surface section located between said first and second screw means shaft, and a second conically shaped smooth surface section located between said third and fourth screw means said conically shaped sections being aligned with respective said first and second orifices of said holder means;
 (e) means for introducing plastic resin into said holder means at a station wherein are located intermeshed first screw means of said shafts;
 (f) means for introducing foaming agent into said holder means at a station wherein are located said separate second screw means of said shaft; and
 (g) means for rotating said shafts whereby said plastic resin is moved from said intermeshed first screw means to said second screw means wherein said foaming agent is introduced and the combined mixture is moved to said intermeshed third screw means to be kneaded thereat, and thereupon the resulting kneaded product being moved to said separate fourth screw means.

2. Extruder of claim 1, wherein said third screw means comprises intensive mixer rollers.

References Cited
UNITED STATES PATENTS

| | | |
|---|---|---|
| 2,048,286 | 7/1936 | Pease. |
| 2,693,348 | 11/1954 | Ellermann. |
| 3,026,273 | 3/1962 | Engles. |
| 3,143,767 | 8/1964 | Watts et al. |
| 3,287,477 | 11/1966 | Veselend. |

WILLIAM J. STEPHENSON, Primary Examiner